United States Patent
Nishihara et al.

(10) Patent No.: US 9,561,464 B2
(45) Date of Patent: Feb. 7, 2017

(54) COMPRESSED AIR DRYING DEVICE

(71) Applicant: NABTESCO AUTOMOTIVE CORPORATION, Tokyo (JP)

(72) Inventors: Tomoya Nishihara, Tokyo (JP); Ichiro Minato, Tokyo (JP); Masanori Momoki, Tokyo (JP)

(73) Assignee: NABTESCO AUTOMOTIVE CORPORATION, Tokyo (JP)

(*) Notice: Subject to any disclaimer, the term of this patent is extended or adjusted under 35 U.S.C. 154(b) by 0 days.

(21) Appl. No.: 14/434,937

(22) PCT Filed: Oct. 11, 2013

(86) PCT No.: PCT/JP2013/077750
§ 371 (c)(1),
(2) Date: Apr. 10, 2015

(87) PCT Pub. No.: WO2014/061582
PCT Pub. Date: Apr. 24, 2014

(65) Prior Publication Data
US 2015/0258492 A1 Sep. 17, 2015

(30) Foreign Application Priority Data
Oct. 15, 2012 (JP) .................. 2012-228028

(51) Int. Cl.
*B01D 53/02* (2006.01)
*B01D 53/26* (2006.01)
*B01D 53/04* (2006.01)

(52) U.S. Cl.
CPC ......... *B01D 53/261* (2013.01); *B01D 53/0415* (2013.01)

(58) Field of Classification Search
CPC .................. B01D 53/0415; B01D 53/261
See application file for complete search history.

(56) References Cited

U.S. PATENT DOCUMENTS 3,472,000 A * 10/1969 Bridigum ............... B01D 53/26
96/113
4,097,248 A * 6/1978 Frantz ................... B01D 53/26
95/105
(Continued)

FOREIGN PATENT DOCUMENTS

CN 1607025 A 4/2005
CN 201510834 U 6/2010
(Continued)

OTHER PUBLICATIONS

International Preliminary Report on Patentability as issued in International Patent Application No. PCT/JP2013/077750, dated Apr. 21, 2015.
(Continued)

*Primary Examiner* — Christopher P Jones
(74) *Attorney, Agent, or Firm* — Pillsbury Winthrop Shaw Pittman LLP (57) ABSTRACT

A compressed air drying device includes a support case, a drying container installed in the support case, and a cover installed on the support case while covering the drying container. In load operation, compressed air that flows from an inlet of the support case is dried by a desiccant, and the dried compressed air is discharged. In unload operation, the compressed air inside the cover is passed through the inside of the drying container and oil and water is drained from a drain outlet. The compressed air drying device further includes an inlet opening/closing device that opens the inlet in the load operation, and closes the inlet in the unload operation.

10 Claims, 9 Drawing Sheets

(56) References Cited

U.S. PATENT DOCUMENTS

| | | | |
|---|---|---|---|
| 4,336,042 A * | 6/1982 | Frantz | B01D 53/261 |
| | | | 55/475 |
| 4,714,483 A | 12/1987 | Koening et al. | |
| 4,936,026 A | 6/1990 | Cramer et al. | |
| 5,002,593 A * | 3/1991 | Ichishita | B60T 17/004 |
| | | | 55/337 |
| 5,027,529 A | 7/1991 | Cramer et al. | |
| 5,103,576 A | 4/1992 | Cramer et al. | |
| 5,807,422 A * | 9/1998 | Grgich | B01D 53/0454 |
| | | | 95/10 |
| 2012/0137887 A1* | 6/2012 | Minato | B01D 53/0415 |
| | | | 96/118 |

FOREIGN PATENT DOCUMENTS

| | | |
|---|---|---|
| CN | 201889150 U | 7/2011 |
| CN | 202237735 U | 5/2012 |
| JP | 62-298424 | 12/1987 |
| JP | 5-30479 | 4/1993 |
| JP | 5-505759 | 8/1993 |
| JP | 2003-511306 A | 3/2003 |
| JP | 2010-029801 A | 2/2010 |
| JP | WO 2011019084 A2 * | 2/2011 ......... B01D 53/0415 |

OTHER PUBLICATIONS

International Search Report as issued in International Patent Application No. PCT/JP2013/077750, dated Jan. 21, 2014.
First Office Action as issued in Chinese Patent Application No. 201380053501.X, dated Jan. 26, 2016.

* cited by examiner

(Load Operation)

Fig.4
(Unload Operation)

Fig.5

(Load Operation)

Fig.6
(Unload Operation)

COMPRESSED AIR DRYING DEVICE

CROSS-REFERENCE TO RELATED APPLICATIONS

This application is the U.S. National Stage of PCT/JP2013/077750, filed Oct. 11, 2013, which in turn claims priority to Japanese Patent Application No. 2012-228028, filed Oct. 15, 2012. The contents of all of these applications are incorporated herein by reference in their entirety.

FIELD OF THE INVENTION

The present invention relates to a compressed air drying device for drying compressed air supplied by a compressor.

BACKGROUND OF THE INVENTION

A vehicle such as a truck, a bus, or a construction machine controls systems of a brake, a suspension, and the like using compressed air delivered by a compressor, which is directly connected to an internal combustion engine (hereinafter, an engine). The compressed air contains water from atmospheric air and lubricant oil from the interior of the compressor. If the compressed air containing water and oil enters the systems, rusting and swelling of rubber members (such as O rings) occur, thus hampering operation of the systems. Therefore, a compressed air drying device, which removes water and oil from compressed air, is arranged downstream of the compressor in an air system (see, for example, Patent Document 1).

The compressed air drying device has a filter and is filled with desiccant such as silica gel or zeolite. The desiccant of the compressed air drying device adsorbs and removes water from compressed air, thus drying the compressed air.

When performing load operation for removing water, the compressed air drying device causes compressed air, which is introduced through an inlet, to pass through a drying container from below to above. The compressed air drying apparatus retains the dry compressed air in a purge tank and, meanwhile, supplies the dry compressed air to a main tank through an outlet. When carrying out unload operation for regenerating the desiccant, the compressed air drying device opens a drain valve of a draining device to cause the dry compressed air retained in the purge tank to pass through the drying container from above to below, thus discharging oil and water through the drain valve. The compressed air drying device periodically performs the load operation and the unload operation in a repeated manner.

PRIOR ART DOCUMENTS

Patent Documents

Patent Document 1: Japanese Laid-Open Patent Publication No. 2010-29801

SUMMARY OF THE INVENTION

Forced induction devices, which are attached to engines, have been considered as a means for generating compressed air to be supplied to a compressor. This would decrease the air compression amount of the compressor, thus improving efficiency of the compressor and reducing the size of the compressor. However, when the compressed air drying device performs the unload operation, the drain valve is open and discharges the compressed air, which has been introduced through the inlet, into the atmospheric air. That is, the compressed air supplied by the forced induction device is discharged into the atmospheric air through the compressor. Since the compressed air that has been supplied by the forced induction device is thus released from the compressed air drying device, the forced induction pressure of the forced induction device in the engine is decreased. Therefore, it is necessary to provide a compressed air drying device capable of limiting influence on the forced induction pressure of the forced induction device.

Accordingly, it is an objective of the present invention to provide a compressed air drying device capable of limiting influence on forced induction pressure of a forced induction device.

Means for achieving the above objectives and advantages thereof will now be discussed.

To achieve the foregoing objective, a compressed air drying device is provided that includes a support case, a drying container, and a cover. The support case has an inlet into which compressed air is introduced from a compressor connected to a forced induction device, an outlet that discharges the compressed air and includes a check valve, and a drain port that drains oil and water and includes a drain valve device. The drying container is filled with a desiccant and installed in the support case. The cover covers the drying container and is installed in the support case. In load operation, the compressed air drying device dries the compressed air introduced through the inlet by means of the desiccant and discharges the dry compressed air through the outlet. In unload operation, the compressed air drying device passes the compressed air in the cover through the drying container and drains oil and water through the drain port. The compressed air drying device further includes an inlet opening/closing device that opens the inlet in the load operation and closes the inlet in the unload operation.

In this configuration, in the load operation, the compressed air that has been compressed by the forced induction device is further compressed by the compressor. Further, the compressed air is introduced through the inlet of the compressed air drying device opened by the inlet opening/closing device. This decreases the compression amount of the compressor, thus reducing the size of the compressor. In the unload operation, the inlet opening/closing device closes the inlet such that the compressed air that has been compressed by the forced induction device is not introduced into the compressed air drying device via the compressor. The compressed air from the forced induction device is thus neither introduced through the inlet of the compressed air drying device nor discharged through the drain port. This limits influence on the forced induction pressure of the forced induction device.

The inlet opening/closing device includes a valve member and an urging spring for urging the valve member toward a valve seat. In the load operation, the valve member is moved to open the inlet against the urging spring by the compressed air introduced from the compressor. In the unload operation, the valve member is moved to close the inlet by the urging spring.

In this configuration, in the load operation, the compressed air moves the valve member against the urging spring, thus opening the inlet of the compressed air drying device. In the unload operation, the urging spring closes the inlet of the compressed air drying device. In this manner, the inlet opening/closing device performs automatic opening/closing using the compressed air introduced through the inlet and by means of the urging spring. This allows the inlet opening/closing device to be configured simply by the valve member and the urging spring.

The inlet opening/closing device includes a valve member. In the load operation, the valve member is moved to open the inlet by the compressed air introduced from the compressor. In the unload operation, the valve member is moved to close the inlet by the compressed air introduced through the drain port.

In this configuration, in the load operation, the compressed air supplied by the compressor causes the valve member to open the inlet of the compressed air drying device. In the unload operation, the compressed air supplied through the drain port moves the valve member to close the inlet of the compressed air drying device. In this manner, the inlet opening/closing device performs automatic opening/closing through movement of the valve member caused by the compressed air from the different sources. This allows the inlet opening/closing device to be configured simply by the valve member.

The support case includes a communication line through which the compressed air introduced through the drain port is blown onto the valve member.

In this configuration, in the unload operation, the compressed air is blown onto the valve member through the communication line, which is arranged in the support case. As a result, when the compressed air is supplied through the drain port, the compressed air passing through the communication line ensures easy movement of the valve member.

In the unload operation, the valve member is moved to close the inlet by the compressed air for driving the drain valve device.

In this configuration, in the unload operation, the compressed air for driving the drain valve device is introduced and moves the valve member in a direction in which the inlet is closed. As a result, the inlet is closed reliably by the valve member.

Effects of the Invention

The present invention is capable of limiting influence on forced induction pressure of a forced induction device by a compressed air drying device.

DETAILED DESCRIPTION OF THE PREFERRED EMBODIMENTS

First Embodiment

A compressed air drying device according to a first embodiment will now be described with reference to FIGS. 1 to 4.

Figure 1:
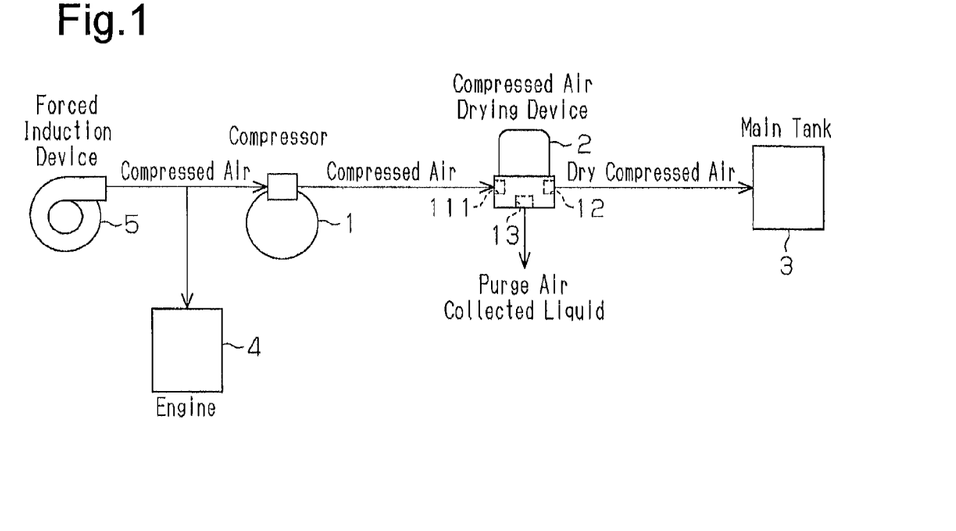
FIG. 1 is a block diagram showing the location of a compressed air drying device in an air system according to a first embodiment.

With reference to FIG. 1, a vehicle such as a truck, a bus, or a construction machine controls systems of a brake, a suspension, and the like using compressed air delivered by a compressor 1. A compressed air drying device 2 is arranged downstream of the compressor 1 in an air system to remove oil and water from the compressed air and provide dry compressed air. Desiccant is arranged in the compressed air drying device 2. The compressed air drying device 2 performs dehumidification (load operation) for removing oil and water from the compressed air and regeneration (unload operation) for regenerating the desiccant by removing and releasing the oil and water adsorbed by the desiccant to the exterior. The compressed air drying device 2 supplies the dry compressed air to a main tank 3. The compressed air drying device 2 is automatically switched between the load operation and the unload operation in correspondence with the pressure in the main tank 3 and the pressure in a second tank 17 (FIGS. 3 and 4).

In the first embodiment, a forced induction device 5 is connected to an engine 4. Compressed air, which has been compressed by the forced induction device 5, is supplied to the compressor 1, thus decreasing the compression amount of the compressor 1. The size of the compressor 1 is thus reduced compared to a compressor mounted in a vehicle without a forced induction device 5.

Figure 3:
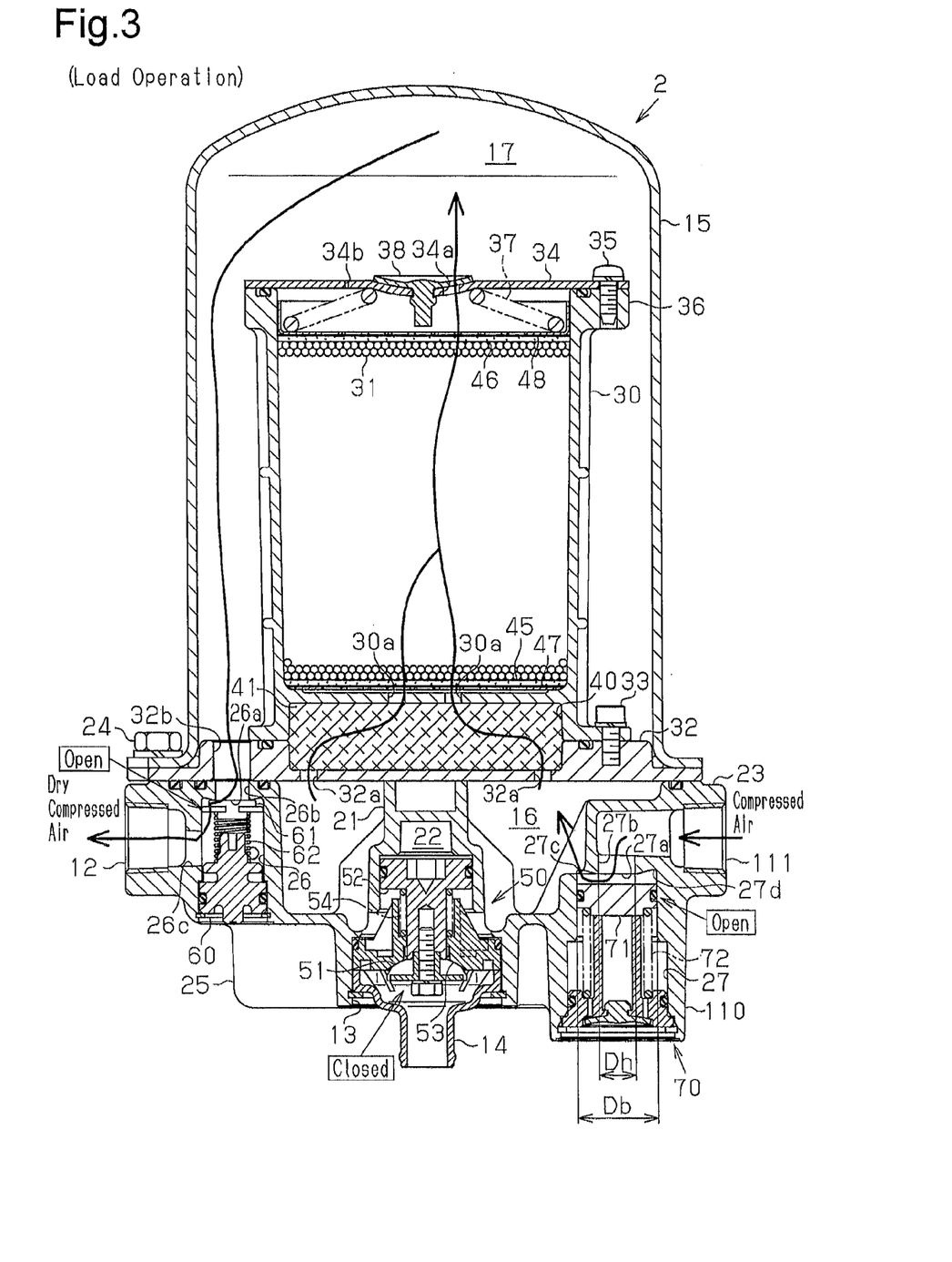
FIG. 3 is a cross-sectional view showing the configuration of the interior of the compressed air drying device of FIG. 1 in the load operation.
Figure 4:
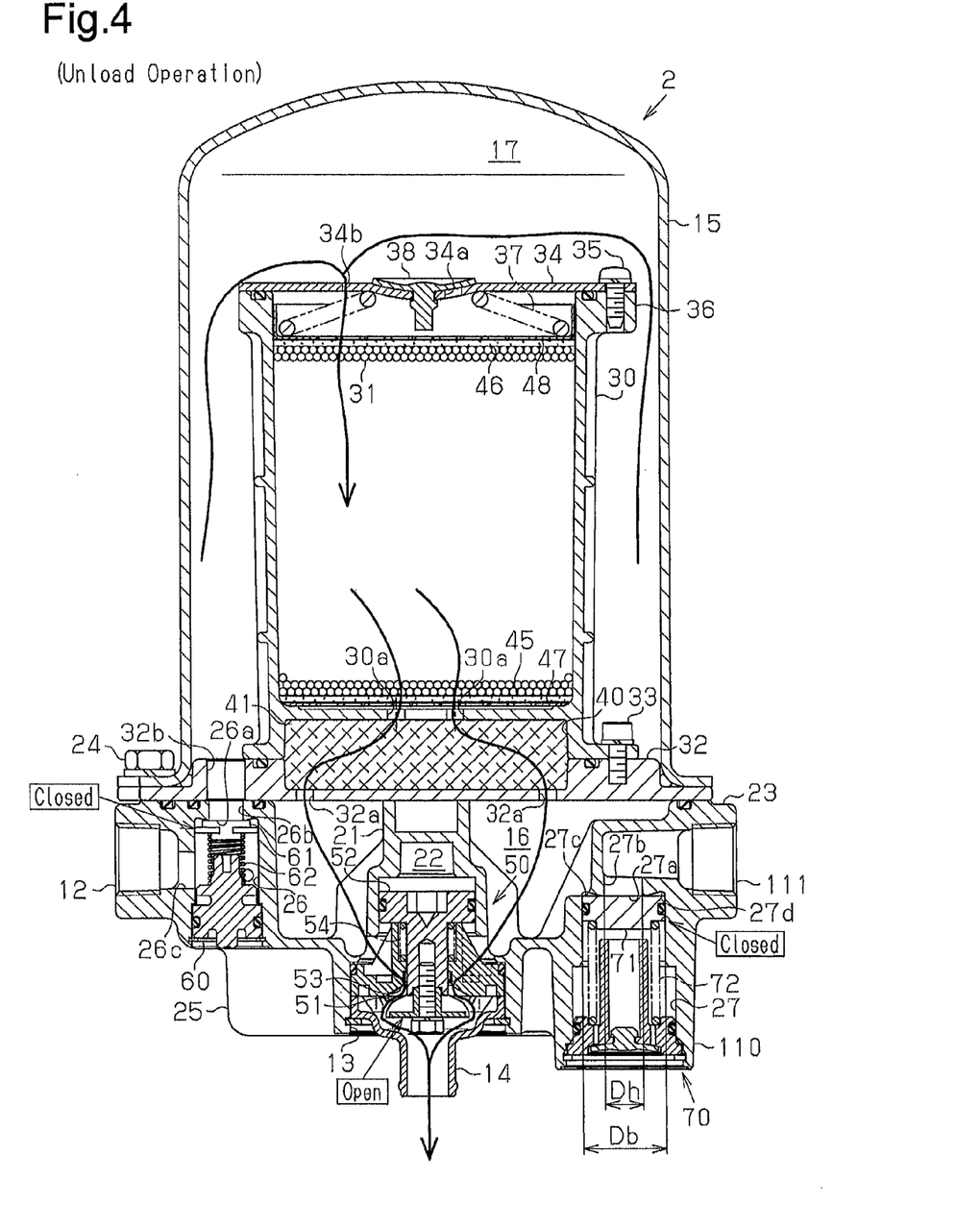
FIG. 4 is a cross-sectional view showing the configuration of the interior of the compressed air drying device of FIG. 1 in the unload operation.

As illustrated in FIGS. 3 and 4, the compressed air drying device 2 includes a support case 110, a drying container 30, and a purge tank 15, all of which have a cylindrical shape with a closed end. The drying container 30 is installed in the support case 110. The purge tank 15 has an opening facing the support case 110. The purge tank 15 shields the drying container 30 and is attached to the support case 110. The drying container 30 is filled with a desiccant 31. The purge tank 15 corresponds to a cover.

An inlet 111 and an outlet 12 are formed in an upper portion of a side of the support case 110 to face each other. Compressed air supplied by the compressor 1 is introduced through the inlet 111. Dry compressed air is discharged into the main tank 3 through the outlet 12. A check valve 60 is arranged in the outlet 12. A drain port 13, which drains collected liquid in the unload operation, is formed at the center of a bottom portion 25 of the support case 110. An internal cylindrical portion 21 is formed in the support case 110. The space between the support case 110 and the internal cylindrical portion 21 functions as a first tank 16 for retaining the compressed air that has been introduced through the inlet 111. A drain valve device 50 for selectively opening and closing the drain port 13 is arranged in the internal cylindrical portion 21. The drain port 13 communicates with the internal cylindrical portion 21. An upper portion of the internal cylindrical portion 21 is closed. An air discharge pipe 14 is attached to and exposed from the drain port 13.

An attachment plate 32, which is attached to the support case 110, is fixed to a lower portion of the drying container 30 using a bolt 33. The purge tank 15 shields the drying container 30 and is attached to an upper end portion 23 of the support case 110 through the attachment plate 32 using a bolt 24. The space between the purge tank 15 and the drying container 30 functions as a second tank 17 for retaining dry compressed air that has been dehumidified. The first tank 16 communicates with the second tank 17 through the drying container 30, which is filled with the desiccant 31.

The drain valve device 50 includes a valve member 51 for selectively opening and closing the drain port 13 and a piston 52 for moving the valve member 51. The valve member 51 is adapted to move integrally with the piston 52 and to be seated on a valve seat 53 of the drain valve device 50. The piston 52 is adapted to close a space 22 that is formed in the internal cylindrical portion 21, and urged upward (toward the space 22) by an urging spring 54. As compressed air is supplied to the space 22, the piston 52 is depressed. The valve member 51 is depressed together with the piston 52 and received by the valve seat 53. This closes the drain port 13. In contrast, as air is discharged from the space 22, the piston 52 is pressed upward by the urging spring 54. The valve member 51 is pressed upward together with the piston 52 and separated from the valve seat 53, thus opening the drain port 13.

The drain valve device 50 is closed in the load operation. When the pressure in the main tank 3 increases and reaches a predetermined maximum pressure Pmax, the drain valve device 50 supplies compressed air to the space 22 in response to a command signal from a pressure governor (not shown), thus opening the drain port 13. In this manner, the unload operation is started. That is, since the drain port 13 is open in the unload operation, collected liquid containing oil and water is rapidly released to the exterior by the compressed air (purge air) in the purge tank 15. When the pressure in the second tank 17 decreases and reaches a predetermined minimum pressure Pmin, the drain valve device 50, which is open in the unload operation, discharges air from the space 22 in response to a command signal from the pressure governor (not shown). The drain port 13 is thus closed by the urging force of the urging spring 54.

The granular desiccant 31 in the drying container 30 is held between a lower plate 45 and an upper plate 46 in the up-and-down direction. A plurality of through holes 30a is formed in the bottom portion of the drying container 30. An impingement member accommodating portion 40, which accommodates an oil separating filter 41, which serves as an impingement member, is formed between a lower portion of the drying container 30 and the attachment plate 32. The attachment plate 32, which is the bottom surface of the impingement member accommodating portion 40, has a plurality of through holes 32a. A fixing portion 36 for fixing a lid member 34 using a screw 35 is arranged in an upper portion of the drying container 30. A first through hole 34a and a second through hole 34b are formed in the lid member 34. A check valve 38, which only permits a flow from the purge tank 15 to the drying container 30, is attached to the first through hole 34a.

The oil separating filter 41 is formed of crushed aluminum. The oil separating filter 41 is press-fitted in the impingement member accommodating portion 40. While compressed air passes through the interior of the oil separating filter 41, oil and dust in the compressed air strike the impingement member and are removed from the compressed air.

The lower plate 45 and the upper plate 46 each include a plurality of non-illustrated through holes. A lower thin film 47 formed of nonwoven fabric, which holds the desiccant 31, is arranged on an upper surface of the lower plate 45. An upper thin film 48 formed of nonwoven fabric, which holds the desiccant 31, is provided along a lower surface of the upper plate 46. The nonwoven fabric is formed of, for example, polyester and rayon.

A coil spring 37 is arranged between the upper plate 46 and the lid member 34, which is fixed to the drying container 30. The coil spring 37 thus produces urging force by which the upper plate 46 is pressed downward. The urging force of the coil spring 37 is applied to the upper plate 46, the desiccant 31, and the lower plate 45 in a manner transmitted from the upper plate 46 to the lower plate 45 through the desiccant 31. In this manner, the desiccant 31 is maintained in a state urged by the coil spring 37.

The check valve 60 includes a valve member 61 for selectively opening and closing the outlet 12 and an urging spring 62 for urging the valve member 61 upward. A cylindrical first accommodating space 26 having an opening in the bottom portion 25 of the support case 110 is formed in the bottom portion 25 at a position close to the outlet 12. The check valve 60 is installed in the first accommodating space 26. The first accommodating space 26 communicates with the purge tank 15 through an outlet through hole 32b and a third communication hole 26b and with the outlet 12 via a fourth communication hole 26c. The check valve 60 is installed in the first accommodating space 26 from the side corresponding to the bottom surface of the support case 110, thus sealing the first accommodating space 26.

The valve member 61 of the check valve 60 is movable in the up-and-down direction as viewed in FIG. 3 and comes into contact with a first upper bottom surface 26a of the first accommodating space 26, thus closing the third communication hole 26b. That is, the first upper bottom surface 26a functions as a valve seat. The check valve 60 closes the outlet 12 by closing the third communication hole 26b by means of the valve member 61. The third communication hole 26b is formed at the center of the first upper bottom surface 26a of the first accommodating space 26.

In the check valve 60, the compressed air supplied by the compressor 1 strikes the upper surface of the valve member 61. This depresses the valve member 61 against the urging force of the urging spring 62, thus opening the third communication hole 26b. When the pressure in the main tank 3 reaches the predetermined maximum pressure Pmax, the pressure of the compressed air supplied by the compressor 1 and the pressure at the side corresponding to the outlet 12 are equilibrated in the check valve 60. This stops generation of the force for depressing the valve member 61 in the check valve 60, thus closing the third communication hole 26b by the urging force of the urging spring 62. That is, the check valve 60 opens the outlet 12 in the load operation and closes the outlet 12 in the unload operation.

In the first embodiment, an inlet opening/closing device 70 for selectively opening and closing the inlet 111 is arranged in the inlet 111. The inlet opening/closing device 70 includes a valve member 71 for selectively opening and closing the inlet 111 and an urging spring 72 for urging the valve member 71 upward. A cylindrical second accommodating space 27 having an opening in the bottom portion 25 of the support case 110 is formed in the bottom portion 25 at a position close to the inlet 111. The inlet opening/closing device 70 is installed in the second accommodating space 27. The second accommodating space 27 communicates with the inlet 111 through a first communication hole 27b and with the first tank 16 via a second communication hole 27c. The inlet opening/closing device 70 is installed in the second accommodating space 27 from the side corresponding to the bottom surface of the support case 110, thus sealing the second accommodating space 27.

The valve member 71 of the inlet opening/closing device 70 is movable in the up-and-down direction as viewed in the drawing and comes into contact with a second upper bottom surface 27a of the second accommodating space 27, thus closing the first communication hole 27b and the second communication hole 27c. That is, the second upper bottom surface 27a functions as a valve seat. The inlet opening/closing device 70 closes the inlet 111 by closing the first communication hole 27b and the second communication hole 27c by means of the valve member 71.

The first communication hole 27b is formed at the center of the second upper bottom surface 27a of the second accommodating space 27. That is, the diameter Dh of the first communication hole 27b is smaller than the diameter Db of the valve member 71 and is approximately half the diameter Db. The second communication hole 27c is formed in a portion of a peripheral portion of the second upper bottom surface 27a. A recess is formed in a peripheral end portion 27d of the second upper bottom surface 27a. As a result, the peripheral end portion 27d communicates with the first tank 16 even when the valve member 71 is held in contact with the second upper bottom surface 27a.

In the inlet opening/closing device 70, the compressed air supplied by the compressor 1 strikes the upper surface of the valve member 71 in the range defined by the diameter Dh. This depresses the valve member 71 against the urging force of the urging spring 72, thus opening the first communication hole 27b and the second communication hole 27c. When the pressure in the main tank 3 reaches the predetermined maximum pressure Pmax, the check valve 60 is closed. As a result, in the inlet opening/closing device 70, the pressure of the compressed air supplied by the compressor 1 and the pressure in the first tank 16 become equilibrated. After the drain port 13 is opened by the drain valve device 50, the pressure of the compressed air in the first tank 16 is decreased and the pressure of the compressed air striking the upper surface of the valve member 71 in the range defined by the diameter Db is also decreased. This stops generation of the force for depressing the valve member 71 in the inlet opening/closing device 70, thus closing the first communication hole 27b and the second communication hole 27c by the urging force of the urging spring 72. Specifically, in the inlet opening/closing device 70, valve closing pressure is set to a value smaller than valve opening pressure. The valve of the inlet opening/closing device 70 is opened by receiving the compressed air under high pressure in the range defined by the diameter Dh. In the period immediately after the valve is opened, the compressed air under high pressure is received in the range defined by the diameter Db, which is greater than the diameter Dh. This prevents the inlet opening/closing device 70 from closing when compressed air delivery is necessary. That is, the inlet opening valve 70 opens the inlet 111 in the load operation and closes the inlet 111 in the unload operation.

Operation of the compressed air drying device according to the first embodiment will hereafter be described with reference to FIGS. 2 to 4. The compressed air drying device 2 is automatically switched between the load operation and the unload operation in correspondence with the pressure in the main tank 3 and the pressure in the second tank 17.

Figure 2:
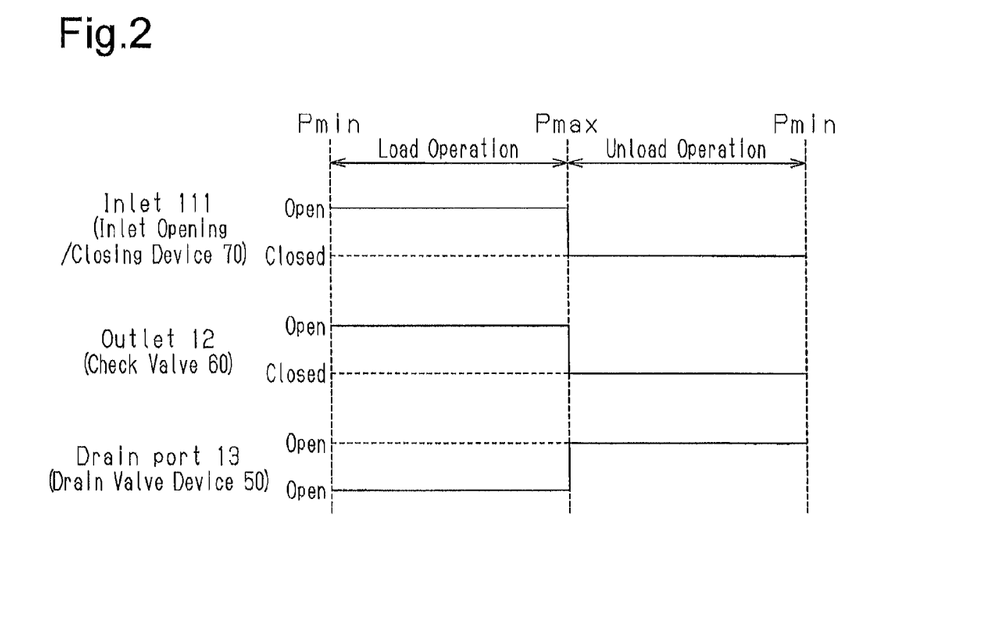
FIG. 2 is a diagram showing open/closed states of an inlet, an outlet, and a drain port in load operation and unload operation performed by the compressed air drying device of FIG. 1.

Referring to FIG. 2, the load operation is started when the pressure in the second tank 17 reaches the predetermined minimum pressure Pmin and ended when the pressure in the main tank 3 reaches the predetermined maximum pressure Pmax. The unload operation is started when the pressure in the main tank 3 reaches the predetermined maximum pressure Pmax and ended when the pressure in the second tank 17 reaches the predetermined minimum pressure Pmin. In the load operation, the inlet 111 and the outlet 12 are open and the drain port 13 is closed. In the unload operation, the inlet 111 and the outlet 12 are closed and the drain port 13 is open.

As illustrated in FIG. 3, in the load operation, the compressed air introduced from the compressor 1 through the inlet 111 passes through the first communication hole 27b of the support case 110 and is blown onto the valve member 71 of the inlet opening/closing device 70. The compressed air thus depresses the valve member 71 against the urging spring 72, thus opening the first communication hole 27b and the second communication hole 27c. The compressed air then passes through the space between the second upper bottom surface 27a of the second accommodating space 27 and the valve member 71 and is introduced into the first tank 16 through the second communication hole 27c. The compressed air, which has been introduced into the first tank 16, is introduced into the impingement member accommodating portion 40 via the through holes 32a of the attachment plate 32 and passes through the oil separating filter 41. Oil and dust are thus removed from the compressed air.

Subsequently, after having passed through the oil separating filter 41, the compressed air passes through the through holes 30a of the drying container 30 and enters the drying container 30. After having been introduced into the drying container 30, the compressed air passes through the lower thin film 47, the through holes of the lower plate 45, and then the desiccant 31. This removes water from the compressed air, or, in other words, dries the compressed air. The dry compressed air then passes through the through holes of the upper plate 46 and the lower thin film 47 and is introduced into the second tank 17, which is the interior of the purge tank 15, via the first through hole 34a of the lid member 34.

The dry compressed air, which has been introduced into the first tank 16, passes through the outlet through hole 32b of the attachment plate 32 and the fourth communication hole 26c of the support case 110 and is blown onto the valve member 61 of the check valve 60. The compressed air thus depresses the valve member 61 against the urging spring 62, thus opening the third communication hole 26b. The dry compressed air then passes through the third communication hole 26b, the first accommodating space 26, and then the fourth communication hole 26c. The dry compressed air is thus retained in the main tank 3 via the outlet 12. The dry compressed air in the main tank 3 is used to operate various devices such as an air brake system.

When the pressure in the main tank 3 reaches the predetermined maximum pressure Pmax, generation of the force for depressing the valve member 61 in the check valve 60 is stopped. This causes the urging force of the urging spring 62 to close the third communication hole 26b. That is, the check valve 60 closes the outlet 12. When the pressure in the main tank 3 reaches the predetermined maximum pressure Pmax, the drain valve device 50 supplies the compressed air to the space 22 in response to a command signal from the pressure governor (not shown), thus depressing the valve member 51 to open the drain port 13. In the inlet opening/closing device 70, when the drain port 13 is open, the pressure of the compressed air in the first tank 16 is decreased to stop generation of the force for depressing the valve member 71. The first communication hole 27b and the second communication hole 27c are thus closed by the urging force of the urging spring 72. That is, the inlet opening/closing device 70 closes the inlet 111. As a result, the compressed air drying device 2 is switched from the load operation to the unload operation.

As illustrated in FIG. 4, when the compressed air drying device 2 performs the unload operation, the inlet opening/closing device 70 closes the inlet 111, the check valve 60 closes the outlet 12, and the drain valve device 50 opens the drain port 13. When the drain port 13 is open, liquid containing oil and water is rapidly released to the exterior by the compressed air (purge air) in the second tank 17.

That is, after having been retained in the second tank 17, the dry compressed air is introduced into the drying container 30 via the second through hole 34b of the lid member 34 and passes through the upper thin film 48, the through holes of the upper plate 46, and then the desiccant 31. In this manner, the desiccant 31 is regenerated. After having passed through the desiccant 31, the compressed air passes through the through holes of the lower plate 45 and the lower thin film 47 and is introduced into the impingement member accommodating portion 40 through the through holes 30a of the drying container 30. After having been introduced into the impingement member accommodating portion 40, the compressed air passes through the oil separating filter 41. The compressed air then passes through the through holes 32a of the attachment plate 32, the first tank 16, and then the drain valve device 50 and is discharged to the exterior through the air discharge pipe 14, together with collected liquid.

As purge air and collected liquid are discharged through the drain port 13, the pressure in the first tank 16 and the pressure in the second tank 17 become close to the atmospheric pressure. This eliminates the difference in pressure between the first tank 16 and the second tank 17, thus stopping discharge of purge air and collected liquid. When the pressure in the second tank 17 reaches the predetermined minimum pressure Pmin, the drain valve device 50 discharges air from the space 22 in response to a command signal from the pressure governor (not shown), thus closing the drain port 13 by the urging force of the urging spring 54. In the inlet opening/closing device 70, the compressed air supplied by the compressor 1 strikes the upper surface of the valve member 71. This depresses the valve member 71 against the urging force of the urging spring 72, thus opening the first communication hole 27b and the second communication hole 27c. That is, the inlet opening/closing device 70 opens the inlet 111. In the check valve 60, the compressed air supplied by the compressor 1 strikes the upper surface of the valve member 61. This depresses the valve member 61 against the urging force of the urging spring 62, thus opening the third communication hole 26b. As a result, the compressed air drying device 2 is switched from the unload operation to the load operation.

In the first embodiment, the inlet opening/closing device 70 is arranged in the inlet 111 of the compressed air drying device 2. The inlet opening/closing device 70 closes the inlet 111 when the compressed air drying device 2 performs the unload operation. Therefore, when the compressed air drying device 2 carries out the unload operation, the compressed air supplied by the forced induction device 5 via the compressor 1 is unlikely to be introduced through the inlet 111 of the compressed air drying device 2. This prevents the compressed air from being discharged through the drain port 13, thus limiting influence on the forced induction pressure of the forced induction device 5. When the compressed air drying device 2 performs the load operation, the inlet opening/closing device 70 opens the inlet 111. The compressed air supplied by the forced induction device 5 via the compressor 1 is thus introduced through the inlet 111 and dried. This decreases the compression amount of the compressor 1, thus reducing the size of the compressor 1.

The above described embodiment achieves the following advantages.

(1) In the load operation, the compressed air that has been compressed by the forced induction device 5 is further compressed by the compressor 1. The compressed air is then introduced through the inlet 111 of the compressed air drying device 2, which has been opened by the inlet opening/closing device 70. This decreases the compression amount of the compressor 1, thus reducing the size of the compressor 1. In the unload operation, the inlet opening/closing device 70 closes the inlet 111, thus stopping the compressed air that has been compressed by the forced induction device 5 from being introduced into the compressed air drying device 2 via the compressor 1. The compressed air from the forced induction device 5 is thus neither introduced through the inlet 111 of the compressed air drying device 2 nor discharged through the drain port 13. As a result, influence on the forced induction pressure of the forced induction device 5 is limited.

(2) In the load operation, the compressed air moves the valve member 71 against the urging spring 72, thus opening the inlet 111 of the compressed air drying device 2. In the unload operation, the urging spring 72 closes the inlet 111 of the compressed air drying device 2. In this manner, the inlet opening/closing device 70 performs automatic opening/closing using the urging spring 72. This allows the inlet opening/closing device 70 to be configured simply by the valve member 71 and the urging spring 72.

Second Embodiment

Next, a compressed air drying device according to a second embodiment will be described with reference to FIGS. 5 and 6. The compressed air drying device of the second embodiment is different from the first embodiment in the structure of an inlet opening/closing device. Differences from the first embodiment will mainly be discussed below. The compressed air drying device 2 of the present embodiment has substantially the same configuration as that of the first embodiment except for the structure of the inlet opening/closing device.

Figure 5:
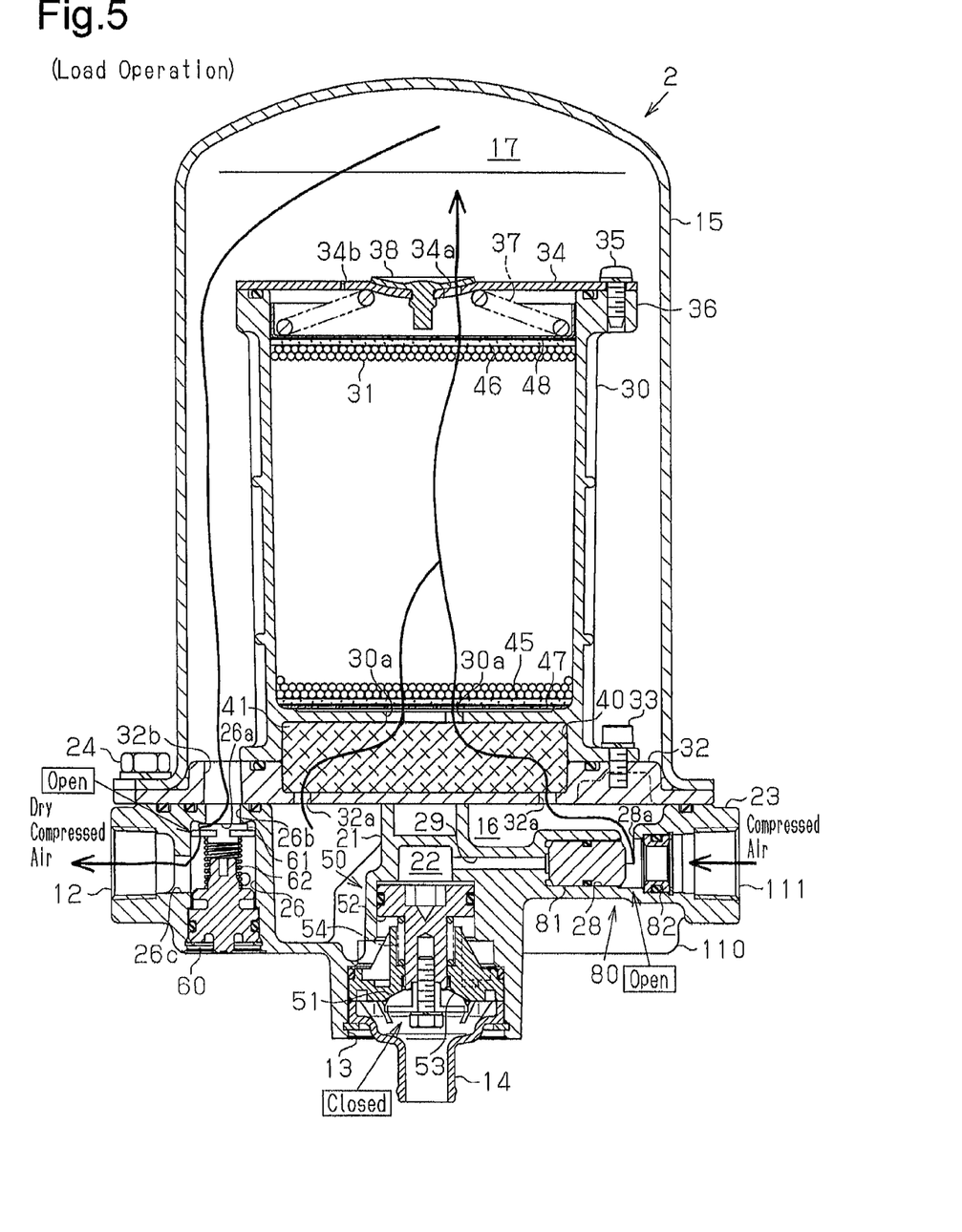
FIG. 5 is a cross-sectional view showing the configuration of the interior of a compressed air drying device according to a second embodiment in the load operation.
Figure 6:
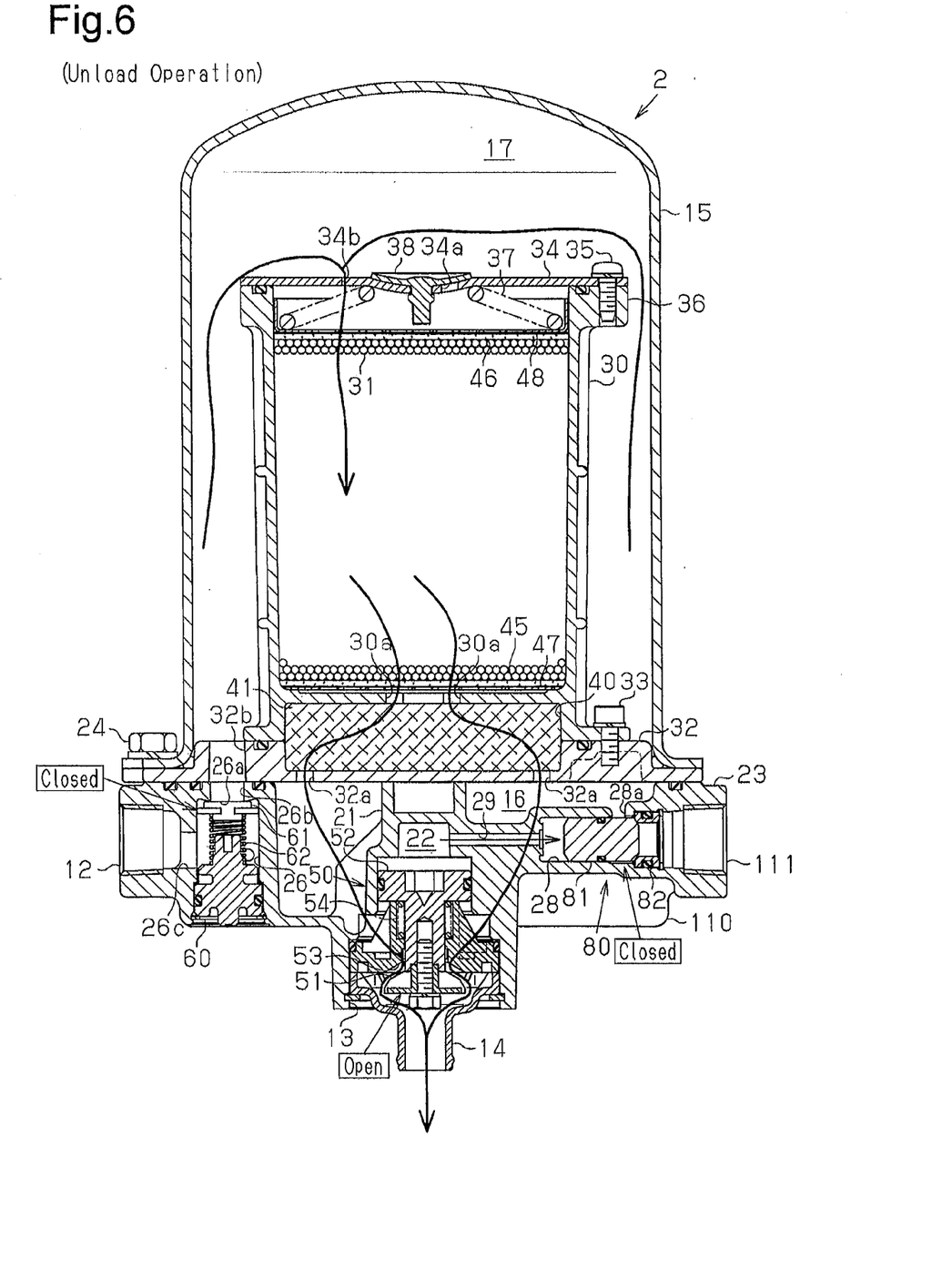
FIG. 6 is a cross-sectional view showing the configuration of the interior of the compressed air drying device of FIG. 5 in the unload operation.

As illustrated in FIGS. 5 and 6, in the second embodiment, an inlet opening/closing device 80 for selectively opening and closing the inlet 111 is arranged in the inlet 111. The inlet opening/closing device 80 includes a columnar valve member 81 for selectively opening and closing the inlet 111 and an annular valve seat 82, which holds the valve member 81. A cylindrical third accommodating space 28 for installing the inlet opening/closing device 80 is formed in the inlet 111 of the support case 110. The third accommodating space 28 communicates with the inlet 111 and with the first tank 16 via a fifth communication hole 28a. The valve member 81 is inserted into the third accommodating space 28 through the inlet 111 of the support case 110 and held in a sealed state in a slidable manner. The valve seat 82 is inserted into the third accommodating space 28 through the inlet 111 of the support case 110 with the valve member 81 inserted in the third accommodating space 28 and fixed by means of a retaining ring or the like. The fifth communication hole 28*a* is closed when the valve member 81 is seated on the end portion of the valve seat 82 that faces the valve member 81.

The support case 110 has a communication line 29, which causes the third accommodating space 28 to communicate with the space 22. When compressed air is supplied to the space 22, the compressed air is supplied to the space in the third accommodating space 28 closed by the valve member 81 through the communication line 29. The supplied compressed air strikes the end surface of the valve member 81 at the side corresponding to the communication line 29, thus pressing the valve member 81 toward the valve seat 82. The valve member 81 is thus received by the valve seat 82 to close the inlet 111 and, also, the fifth communication hole 28*a*. In contrast, when compressed air is supplied through the inlet 111 as air is discharged from the space 22, the supplied compressed air strikes the end surface of the valve member 81 at the side corresponding to the inlet 111, thus pressing the valve member 81 away from the valve seat 82. The valve member 51 thus separates from the valve seat 53 to open the inlet 111 and, also, the fifth communication hole 28*a*.

Operation of the compressed air drying device of the second embodiment will hereafter be described with reference to FIGS. 5 and 6. The compressed air drying device 2 is automatically switched between the load operation and the unload operation in correspondence with the pressure in the main tank 3 and the pressure in the second tank 17. Opening/closing of the inlet 111, the outlet 12, and the drain port 13 in the load and unload operations is controlled in the same manner as the first embodiment.

As illustrated in FIG. 5, in the load operation, the compressed air introduced from the compressor 1 through the inlet 111 is blown onto the valve member 81 of the inlet opening/closing device 80. The compressed air thus presses the valve member 81, opening the fifth communication hole 28*a*. The compressed air then passes through the third accommodating space 28 and is introduced into the first tank 16 via the fifth communication hole 28*a*.

With reference to FIG. 6, when the pressure in the main tank 3 reaches the predetermined maximum pressure Pmax, generation of the force for depressing the valve member 61 in the check valve 60 is stopped. The third communication hole 26*b* is thus closed by the urging force of the urging spring 62. That is, the check valve 60 closes the outlet 12. When the pressure in the main tank 3 reaches the predetermined maximum pressure Pmax, the drain valve device 50 supplies compressed air to the space 22 in response to a command signal from the pressure governor (not shown). This depresses the valve member 51 and thus opens the drain port 13. In the inlet opening/closing device 80, the compressed air supplied to the space 22 is blown from the communication line 29 into the third accommodating space 28. This causes the valve member 81 to be received by the valve seat 82, thus closing the inlet 111. As a result, the compressed air drying device 2 is switched from the load operation to the unload operation.

When the pressure in the second tank 17 reaches the predetermined minimum pressure Pmin, the drain valve device 50 discharges air from the space 22 in response to a command signal from the pressure governor (not shown), thus closing the drain port 13 in correspondence with the urging force of the urging spring 54. In the inlet opening/closing device 80, the air discharged from the space 22 discharges air from the third accommodating space 28 via the communication line 29. The compressed air supplied by the compressor 1 is thus introduced through the inlet 111, thus separating the valve member 81 from the valve seat 82 to open the inlet 111. In the check valve 60, the compressed air supplied by the compressor 1 strikes the upper surface of the valve member 61. This depresses the valve member 61 against the urging force of the urging spring 62, thus opening the third communication hole 26*b*. That is, the check valve 60 opens the outlet 12. As a result, the compressed air drying device 2 is switched from the unload operation to the load operation.

In the second embodiment, the inlet opening/closing device 80 is arranged in the inlet 111 of the compressed air drying device 2. This decreases the compression amount of the compressor 1, thus reducing the size of the compressor 1, as in the first embodiment.

Further, in the unload operation, the compressed air for driving the drain valve device 50 is introduced into the third accommodating space 28 via the communication line 29. The valve member 81 is thus reliably moved in the direction in which the inlet 111 is closed.

The second embodiment provides the following advantages in addition to the advantage (1) of the first embodiment.

(3) In the load operation, the compressed air supplied by the compressor 1 moves the valve member 81 of the inlet opening/closing device 80 to open the inlet 111 of the compressed air drying device 2. In the unload operation, the compressed air supplied through the drain port 13 moves the valve member 81 of the inlet opening/closing device 80 to close the inlet 111 of the compressed air drying device 2. In this manner, the inlet opening/closing device 80 performs automatic opening/closing through movement of the valve member 81 caused by the compressed air from the different sources. This allows the inlet opening/closing device 80 to be configured simply by the valve member 81.

(4) In the unload operation, compressed air is blown onto the valve member 81 through the communication line 29 formed in the support case 110. Therefore, when the compressed air is supplied by the drain port 13, the compressed air passing through the communication line 29 ensures easy movement of the valve member 81.

(5) In the unload operation, the compressed air for driving the drain valve device 50 moves the valve member 81 in the direction in which the valve member closes the inlet 111. The inlet 111 is thus reliably closed by the valve member 81.

Third Embodiment

Next, a compressed air drying device according to a third embodiment will be described with reference to FIGS. 7 and 12. The compressed air drying device of the third embodiment is different from the first embodiment in that it is a cartridge type, in which, when desiccant is replaced, the purge tank including the drying container is replaced. Differences from the first embodiment will mainly be discussed below.

Figure 7:
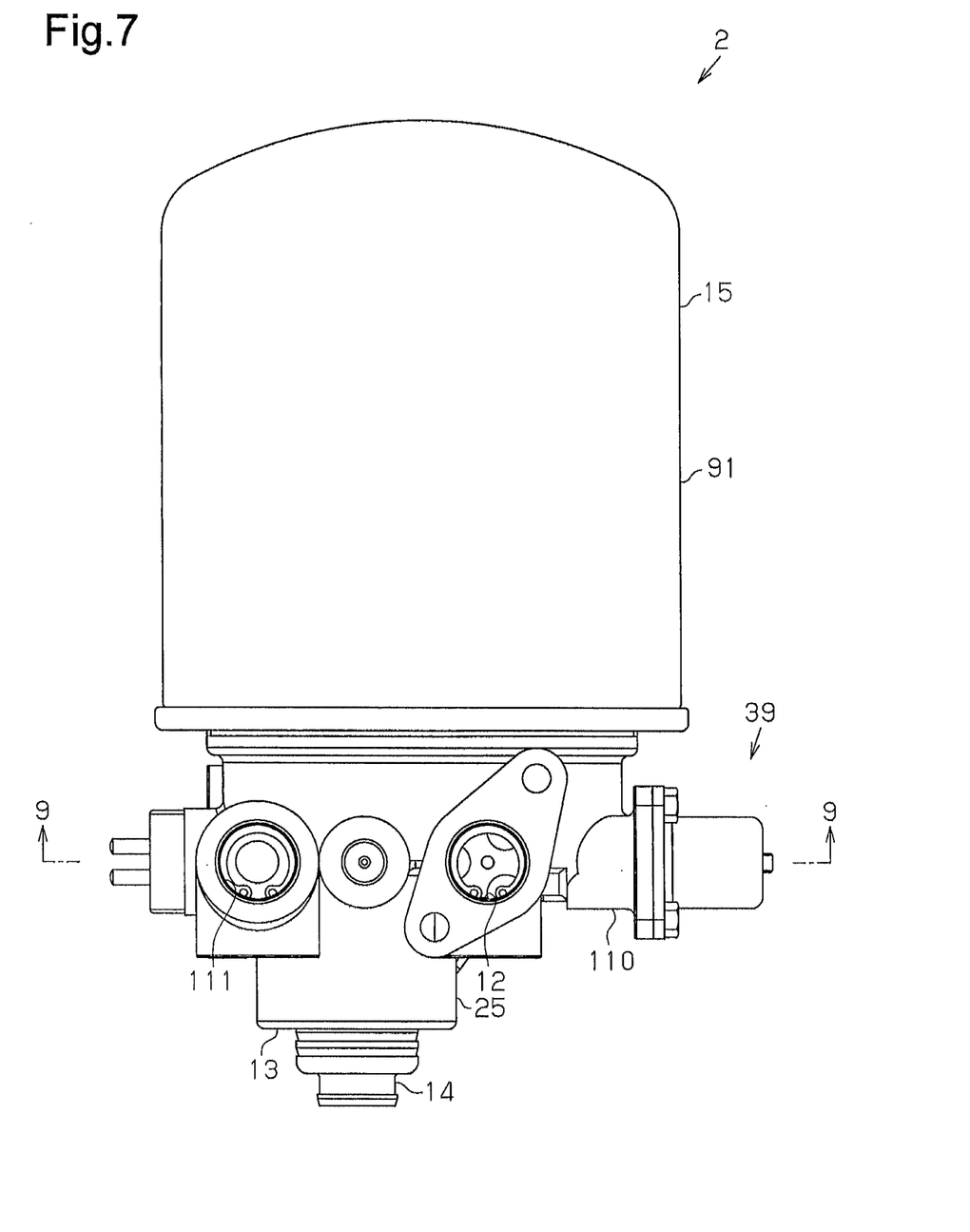
FIG. 7 is a side view showing a side surface of a compressed air drying device according to a third embodiment.
Figure 8:
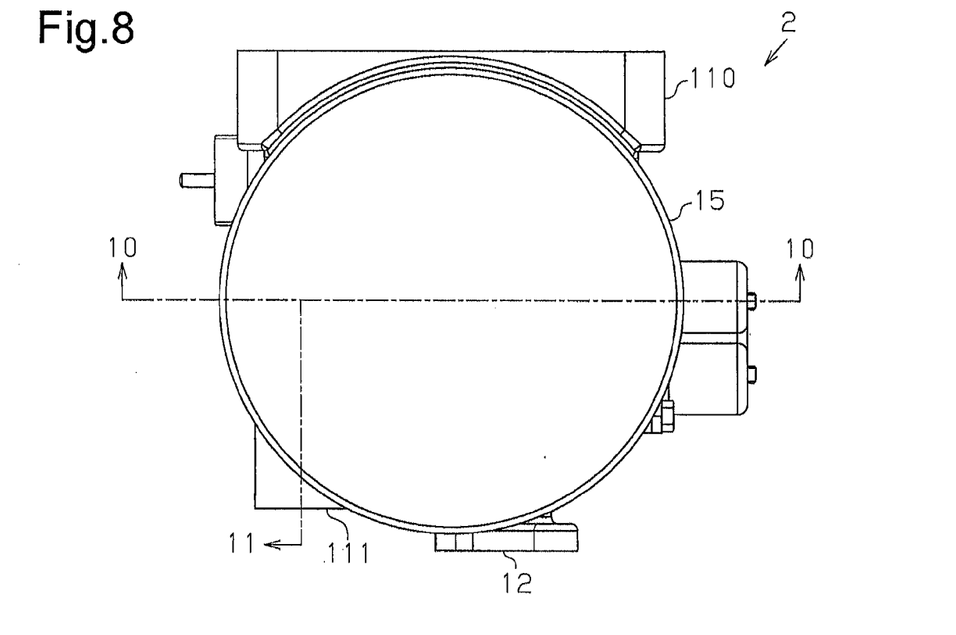
FIG. 8 is a top view showing an upper surface of the compressed air drying device illustrated in FIG. 7.

As illustrated in FIGS. 7 and 8, the compressed air drying device 2 includes a purge tank 15, which has a cylindrical shape with a closed end, and a support case 110 for supporting the purge tank 15. The purge tank 15 corresponds to the cover.

An inlet 111, through which the compressed air supplied by the compressor 1 is introduced, and an outlet 12, through which dry compressed air is discharged into the main tank 3, are arranged in a side of the support case 110 while being oriented in the same direction. The support case 110 includes a pressure governor 39. The drain port 13, through which collected liquid is drained in the unload operation, is arranged at the center of the bottom portion 25 of the support case 110.

Figure 9:
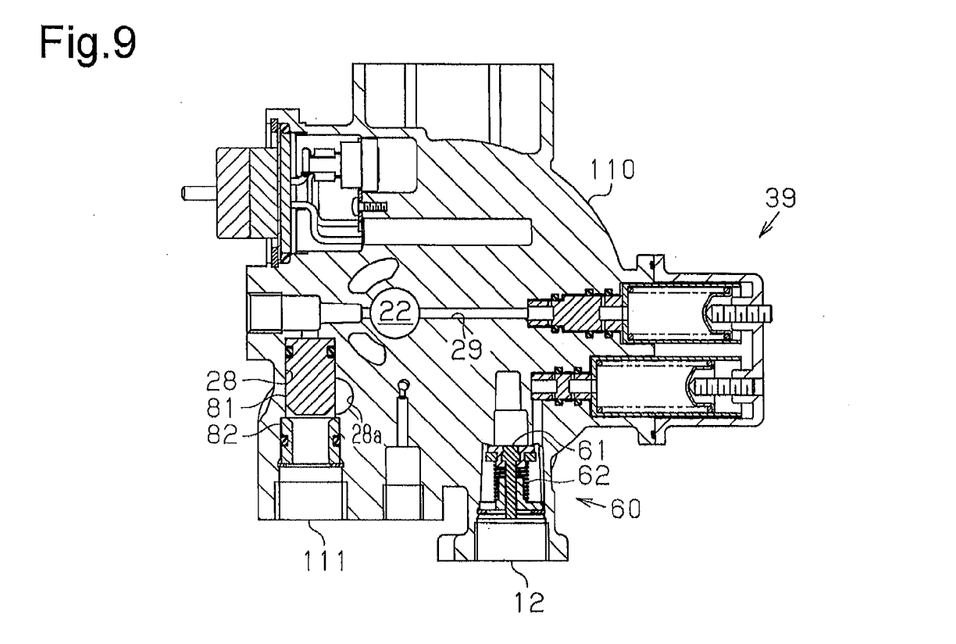
FIG. 9 is a cross-sectional view taken along line 9-9 of the compressed air drying device of FIG. 7 in the load operation.

With reference to FIG. 9, a check valve 60 is provided in the outlet 12. The check valve 60 includes a valve member 61 for selectively opening and closing the outlet 12 and an urging spring 62 for urging the valve member 61 upward. The check valve 60 opens the outlet 12 in the load operation and closes the outlet 12 in the unload operation.

The inlet opening/closing device 80 for selectively opening and closing the inlet 111 is arranged in the inlet 111. The inlet opening/closing device 80 has a columnar valve member 81 for selectively opening and closing the inlet 111 and an annular valve seat 82 for holding the valve member 81. The cylindrical third accommodating space 28 for installing the inlet opening/closing device 80 is formed in the inlet 111 of the support case 110. The third accommodating space 28 communicates with the inlet 111 and with the first tank through the fifth communication hole 28a. The valve member 81 is inserted into the third accommodating space 28 through the inlet 111 of the support case 110 and held in a sealed state in a slidable manner. The valve seat 82 is inserted into the third accommodating space 28 through the inlet 111 of the support case 110 with the valve member 81 inserted in the third accommodating space 28. The valve seat 82 is fixed by means of a retaining ring or the like. The fifth communication hole 28a is closed when the valve member 81 is received by the end portion of the valve seat 82 that faces the valve member 81.

Figure 10:
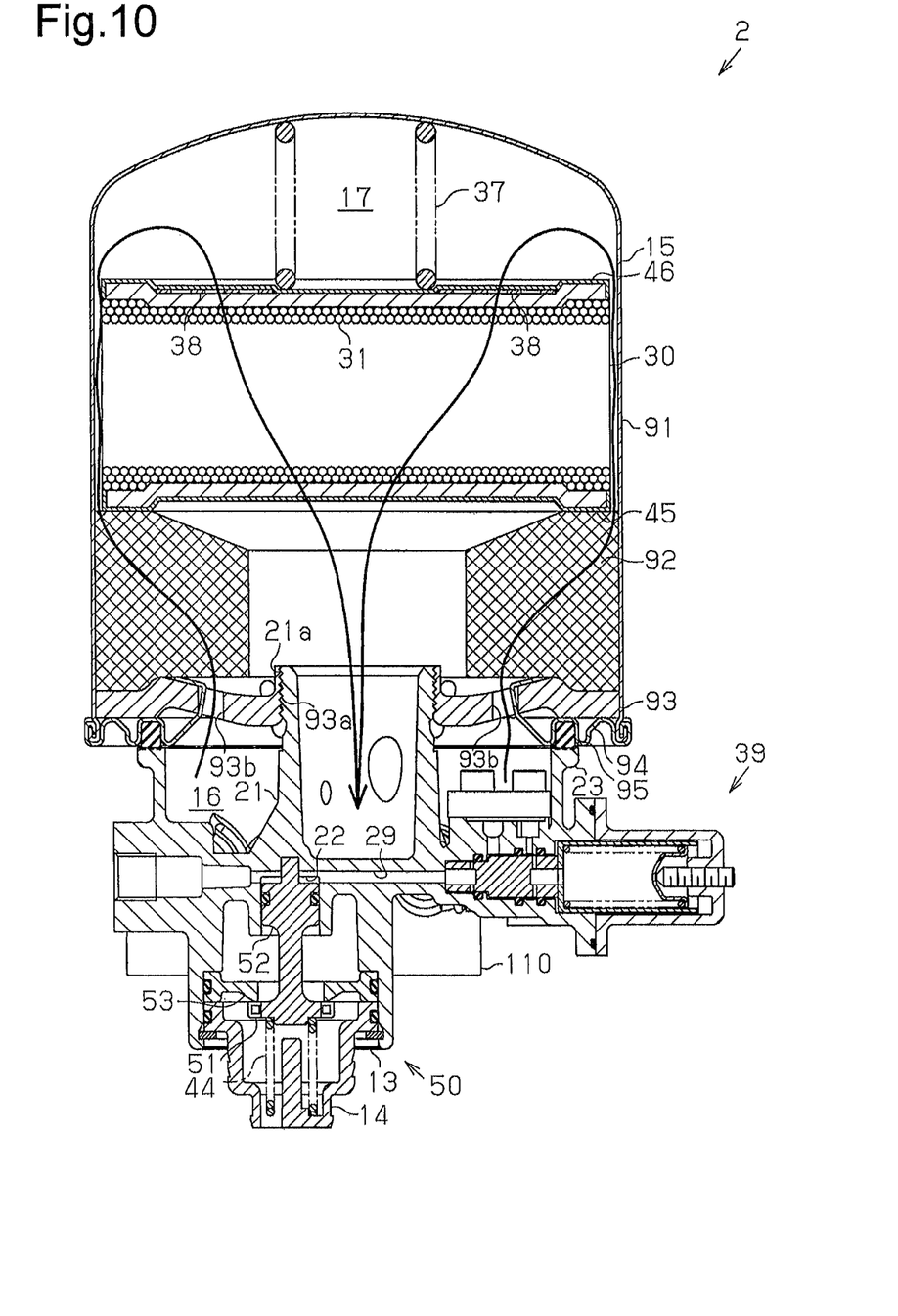
FIG. 10 is a cross-sectional view taken along line 10-10 of FIG. 8.

As illustrated in FIG. 10, the cylindrical portion 21, which has a cylindrical shape with a closed end, is formed at the center of the upper side of the support case 110. An external thread 21a is formed in the outer periphery of the upper side of the cylindrical portion 21. The space between the support case 110 and the cylindrical portion 21 functions as the first tank 16, which retains the compressed air introduced through the inlet 111. A drain valve device 50, which selectively opens and closes the drain port 13, is arranged in the drain port 13. The air discharge pipe 14 is attached to and exposed from the drain port 13.

When compressed air is supplied to the space 22, the compressed air is supplied to the space in the third accommodating space 28 closed by the valve member 81 through the communication line 29. The supplied compressed air strikes the end surface of the valve member 81 at the side corresponding to the communication line 29, thus pressing the valve member 81 toward the valve seat 82. The valve member 81 is thus received by the valve seat 82 to close the inlet 111 and, also, the fifth communication hole 28a. In contrast, when air is discharged from the space 22 and compressed air is supplied through the inlet 111, the supplied compressed air strikes the end surface of the valve member 81 at the side corresponding to the inlet 111, thus pressing the valve member 81 away from the valve seat 82. The valve member 51 thus separates from the valve seat 53 to open the inlet 111 and, also, the fifth communication hole 28a.

The drain valve device 50 includes the valve member 51 for selectively opening and closing the drain port 13 and the piston 52 for moving the valve member 51. The valve member 51 is adapted to move integrally with the piston 52 and to be received by the valve seat 53 of the drain valve device 50. The piston 52 is adapted to close the space 22, which is formed in the support case 110, and urged upward (toward the space 22) by the urging spring 54. When compressed air is supplied to the space 22, the piston 52 is depressed. The valve member 51 is depressed together with the piston 52 and received by the valve seat 53, thus closing the drain port 13. In contrast, as air is discharged from the space 22, the piston 52 is pressed upward by the urging spring 54. The valve member 51 is pressed upward together with the piston 52 and separated from the valve seat 53, thus opening the drain port 13.

The drain valve device 50 is closed in the load operation. When the pressure in the main tank 3 increases and reaches the predetermined maximum pressure Pmax, the compressed air is supplied to the space 22 by the pressure governor 39 to cause the drain valve device 50 to open the drain port 13. In this manner, the unload operation is started. That is, since the drain port 13 is open in the unload operation, liquid containing oil and water is rapidly released to the exterior by the compressed air (purge air) in the purge tank 15. When the pressure in the second tank 17 decreases and reaches the predetermined minimum pressure Pmin, air is discharged from the space 22 through the pressure governor 39 such that the drain port 13 is closed by the urging force of the urging spring 54.

The purge tank 15 includes an outer case 91 having a cylindrical shape with a closed end, an attachment plate 93, an annular oil separating filter 92, and the column-shaped drying container 30. The outer case 91 has an opening facing the support case 110. The attachment plate 93 closes the opening of the outer case 91 and is installed in the support case 110. The drying container 30 is filled with granular desiccant 31. A cylindrical internal thread 93a, which is threaded onto the external thread 21a of the cylindrical portion 21 of the support case 110, is arranged at the center of the attachment plate 93. By threading the attachment plate 93 onto the cylindrical portion 21, the purge tank 15 is installed in the support case 110. The attachment plate 93 is fixed to a fixing member 94 by arranging an outer peripheral portion of the fixing member 94 around the outer case 91. A sealing member 95, which is held in tight contact with the upper end portion 23 of the support case 110 to form a sealed space, is attached to a lower portion of the fixing member 94. The oil separating filter 92 is arranged above the attachment plate 93 and the drying container 30 is arranged above the oil separating filter 92. The desiccant 31 in the drying container 30 is held between the lower plate 45 and the upper plate 46 in the up-and-down direction. The urging spring 37 is arranged in the outer case 91. The urging spring 37 urges the upper plate 46 toward the lower plate 45. The space between the outer case 91 and the drying container 30 functions as the second tank 17, which retains dry compressed air that has been dehumidified. The lower plate 45 and the upper plate 46 each have a plurality of non-illustrated through holes. The check valve 38, which only permits a flow from the second tank 17 to the drying container 30, is attached to the upper plate 46. The attachment plate 93 has through holes 93b.

Operation of the compressed air drying device 2 of the third embodiment will hereafter be described with reference to FIGS. 11 and 12. The compressed air drying device 2 is automatically switched between the load operation and the unload operation in correspondence with the pressure in the main tank 3 and the pressure in the second tank 17. Opening/closing of the inlet 111, the outlet 12, and the drain port 13 in the load and unload operations is controlled in the same manner as the second embodiment.

Figure 11:
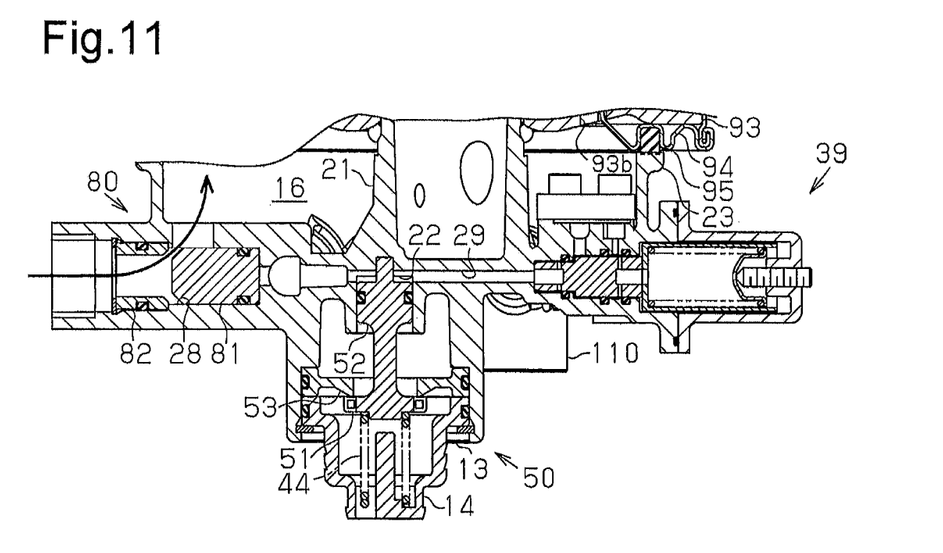
FIG. 11 is a cross-sectional view taken along line 11-11 of FIG. 8.

As illustrated in FIG. 11, in the load operation, the compressed air introduced from the compressor 1 through the inlet 111 is blown onto the valve member 81 of the inlet opening/closing device 80. The compressed air thus presses the valve member 81, opening the fifth communication hole 28a. The compressed air then passes through the third accommodating space 28 and is introduced into the first tank 16 through the fifth communication hole 28a.

Figure 12:
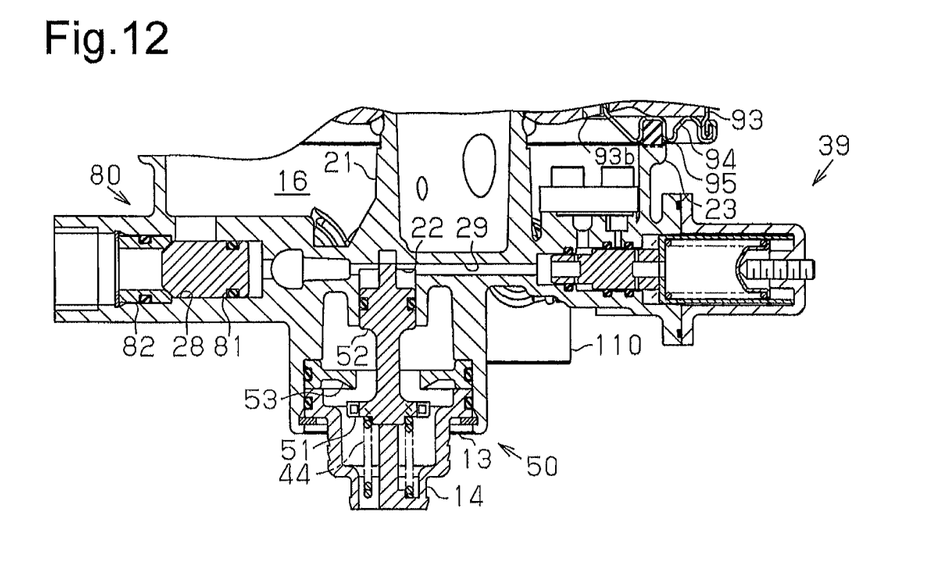
FIG. 12 is a cross-sectional view corresponding to FIG. 11, showing the cross section of the compressed air drying device of FIG. 8.

With reference to FIG. 12, when the pressure in the main tank 3 reaches the predetermined maximum pressure Pmax, the check valve 60 closes the outlet 12. When the pressure in the main tank 3 reaches the predetermined maximum pressure Pmax, compressed air is supplied to the space 22 by the pressure governor 39 to cause the drain valve device 50 to open the drain port 13. Meanwhile, the inlet opening/closing device 80 closes the inlet 111. As a result, the compressed air drying device 2 is switched from the load operation to the unload operation.

When the pressure in the second tank 17 reaches the predetermined minimum pressure Pmin, the drain valve device 50 is caused by the pressure governor 39 to close the drain port 13. When the pressure in the second tank 17 reaches the predetermined minimum pressure Pmin, the inlet opening/closing device 80 opens the inlet 111 and the check valve 60 opens the outlet 12. As a result, the compressed air drying device 2 is switched from the unload operation to the load operation.

In the third embodiment, the inlet opening/closing device 80 is arranged in the inlet 111 of the compressed air drying device 2. This decreases the compression amount of the compressor 1, thus reducing the size of the compressor 1, as in the second embodiment.

Further, in the unload operation, the compressed air for driving the drain valve device 50 is introduced from the pressure governor 39 into the third accommodating space 28 through the communication line 29. This reliably moves the valve member 81 in the direction in which the inlet 111 is closed.

The third embodiment provides the following advantage in addition to the advantage (1) of the first embodiment and the advantages (3) to (5) of the second embodiment.

(6) The purge tank 15, which accommodates the drying container 30, is a cartridge type. This facilitates replacement of the desiccant 31.

The above described embodiments may be modified as follows.

In the unload operation of the second and third embodiments, the compressed air that has been introduced into the space 22 of the drain valve device 50 is introduced into the third accommodating space 28 to move the valve member 81 of the inlet opening/closing device 80. However, the valve member 81 of the inlet opening/closing device 80 may be moved by introducing the purge air into the third accommodating space 28.

In the second embodiment, the communication line 29 is formed in the support case 110. However, an additional communication pipe for introducing the compressed air into the third accommodating space 28 may be employed.

In the first and second embodiments, the valve member 61 of the check valve 60 is moved in the up-and-down direction as viewed in the corresponding drawings. However, the check valve 60 may be arranged in the support case 110 such that the valve member 61 of the check valve 60 is moved in any other suitable direction, such as the left-and-right direction as viewed in the corresponding drawings, as in the third embodiment.

In the first embodiment, the valve member 71 of the inlet opening/closing device 70 is moved in the up-and-down direction as viewed in the corresponding drawings. However, the inlet opening/closing device 70 may be arranged in the support case 110 such that the valve member 71 of the inlet opening/closing device 70 is moved in any other suitable direction, such as the left-and-right direction as viewed in the corresponding drawings.

In the second and third embodiments, the valve member 81 of the inlet opening/closing device 80 is moved in the left-and-right direction as viewed in the corresponding drawings. However, the third accommodating space 28 may be formed in the support case 110 such that the valve member 81 of the inlet opening/closing device 80 is moved in any other suitable direction, such as the up-and-down direction as viewed in the corresponding drawings.

Although the oil separating filter 41 is accommodated in the impingement member accommodating portion 40 in the first and second embodiments, the arrangement and configuration of the impingement member may be changed as needed.

Although crushed aluminum is used for the oil separating filters 41, 92 of the above illustrated embodiments, a member of any other suitable material such as urethane foam, which is sponge, may be employed.

In the configurations of the first and second embodiments, the lower thin film 47 and the upper thin film 48 are formed of nonwoven fabric. However, the lower and upper thin films 47, 48 may be formed of nonwoven fabric containing glass fiber. In this configuration, when dry air passes through the glass fiber, static electricity is produced and causes electrostatic charge, thus ensuring adsorption of smaller oil particles.

In the configurations of the first and second embodiments, the numbers and locations of the through holes 32a of the attachment plate 32, the through holes 30a of the drying container 30, the through holes of the lower plate 45, and the through holes of the upper plate 46 may be changed as needed in correspondence with conditions of removal performance.

In the configuration of the third embodiment, the numbers and locations of the through holes 93b of the attachment plate 93, the through holes of the drying container 30, the through holes of the lower plate 45, and the through holes of the upper plate 46 may be changed as needed in correspondence with conditions of removal performance.

Although the purge tank 15 is threaded onto the support case 110 in the third embodiment, a structure such as a snap-fit structure may be employed as an installation structure.

In the above illustrated embodiments, the purge tank 15, which retains compressed air and functions as the first tank 16, is employed as the cover. However, a cover functioning simply as a cover without retaining the compressed air may be employed as the cover.

DESCRIPTION OF THE REFERENCE NUMERALS

1 . . . compressor, 2 . . . compressed air drying device, 3 . . . main tank, 4 . . . engine, 5 . . . forced induction device, 12 . . . outlet, 13 . . . drain port, 14 . . . air discharge pipe, 15 . . . purge tank, 16 . . . first tank, 17 . . . second tank, 21 . . . internal cylindrical portion, 22 . . . space, 23 . . . upper end portion, 24 . . . bolt, 25 . . . bottom portion, 26 . . . first accommodating space, 26a . . . first upper bottom surface, 26b . . . third communication hole, 26c . . . fourth communication hole, 27 . . . second accommodating space, 27a . . . second upper bottom surface, 27b . . . first communication hole, 27c . . . second communication hole, 27d . . . peripheral end portion, 28 . . . third accommodating space, 28a . . . fifth communication hole, 29 . . . communication line, 30 . . . drying container, 30a . . . through hole, 31 . . . desiccant, 31a . . . through hole, 32 . . . attachment plate, 32a . . . through hole, 32b . . . outlet through hole, 33 . . . bolt, 34 . . . lid member, 34a . . . first through hole, 34b . . . second through hole, 35 . . . screw, 36 . . . fixing portion, 37 . . . coil spring, 38 . . . check valve, 40 . . . impingement member accommodating portion, 41 . . . oil separating filter, 45 . . . lower plate, 45a . . . through hole, 46 . . . upper plate, 46a . . . through hole, 47 . . . lower thin film, 48 . . . upper thin film, 50 . . . drain valve device, 51 . . . valve member, 52 . . . piston, 53 . . . valve seat, 54 . . . urging spring, 55 . . . filter, 60 . . . check valve, 61 . . . valve member, 62 . . . urging spring, 70 . . . inlet opening/closing device, 71 . . . valve member, 72 . . . urging spring, 80 . . . inlet opening/closing device, 81 . . . valve member, 82 . . . valve seat, 91 . . . outer case, 92 . . . oil separating filter 93 . . . attachment plate, 94 . . . fixing member, 95 . . . sealing member, 110 . . . support case, 111 . . . inlet, Db . . . diameter, Dh . . . diameter, Pmax . . . predetermined maximum pressure, Pmin . . . predetermined minimum pressure.

The invention claimed is:

1. A system comprising:
   a compressor operatively connected to and downstream of a forced induction device to receive compressed air therefrom, the compressor being configured to further compress the received compressed air from the forced induction device and to discharge further compressed air; and
   a compressed air drying device operatively connected to and downstream of the compressor, the compressed air drying device comprises:
      an inlet into which the further compressed air is introduced from the compressor;
      an outlet that discharges dry compressed air; and
      a drain port that drains oil and water;
   wherein, in a load operation, the compressed air drying device dries the further compressed air introduced through the inlet and discharges the dry compressed air through the outlet,
   wherein, in an unload operation, the compressed air drying device drains the oil and water through the drain port, and
   wherein the compressed air drying device further includes an inlet opening/closing device that opens the inlet in the load operation and that closes the inlet in the unload operation to prevent the introduction of the further compressed air from the compressor into the compressed air drying device in the unload operation.

2. The system according to claim 1, further comprising:
   a support case;
   a drying container that is filled with a desiccant and installed in the support case; and
   a cover that covers the drying container and is installed in the support case, wherein
   the outlet includes a check valve,
   the drain port includes a drain valve device,
   the inlet, the outlet and the drain port are provided in the support case,
   in the load operation, the compressed air drying device dries the further compressed air by the desiccant, and
   in the unload operation, the compressed air drying device passes the dry compressed air in the cover through the drying container for draining the oil and water through the drain port.

3. The system according to claim 2, wherein
   the inlet opening/closing device includes a valve member,
   in the load operation, the valve member is moved to open the inlet by the further compressed air introduced from the compressor, and
   in the unload operation, the valve member is moved to close the inlet by supplied compressed air introduced through the drain port.

4. The system according to claim 3, wherein the support case includes a communication line through which the supplied compressed air introduced through the drain port is blown onto the valve member.

5. The system according to claim 3, wherein, in the unload operation, the valve member is moved to close the inlet by the supplied compressed air for driving the drain valve device.

6. The system according to claim 4, wherein, in the unload operation, the valve member is moved to close the inlet by the supplied compressed air for driving the drain valve device.

7. The system according to claim 2, wherein
   the inlet opening/closing device includes a valve member and an urging spring for urging the valve member toward a valve seat,
   in the load operation, the valve member is moved to open the inlet against the urging spring by the further compressed air introduced from the compressor, and
   in the unload operation, the valve member is moved to close the inlet by the urging spring.

8. The system according to claim 1, wherein, in the unload operation, the further compressed air initially compressed by the forced induction device, and further compressed by the compressor, is neither introduced through the inlet of the compressed air drying device nor discharged through the drain port of the compressed air drying device so as to limit the influence on a forced induction pressure of the forced induction device.

9. The system according to claim 1, wherein, in the load operation, the inlet opening/closing device opens the inlet to allow into the compressed air drying device the further compressed air initially compressed by the forced induction device and further compressed by the compressor.

10. The system according to claim 1, wherein, in the unload operation, the inlet opening/closing device closes the inlet to stop the further compressed air initially compressed by the forced induction device and further compressed by the compressor from being introduced into the compressed air drying device.

* * * * *